United States Patent [19]

Shigeo

[11] Patent Number: 5,063,491
[45] Date of Patent: Nov. 5, 1991

[54] SWITCHING REGULAR UNDERVOLTAGE DETECTOR

[75] Inventor: Nakamura Shigeo, Yamanashi, Japan

[73] Assignee: Fanuc Ltd., Minamitsuru, Japan

[21] Appl. No.: 459,812

[22] PCT Filed: May 25, 1989

[86] PCT No.: PCT/JP89/00525
§ 371 Date: Jan. 12, 1990
§ 102(e) Date: Jan. 12, 1990

[87] PCT Pub. No.: WO89/12348
PCT Pub. Date: Dec. 14, 1989

[30] Foreign Application Priority Data

Jun. 9, 1988 [JP] Japan .................................. 63-142452

[51] Int. Cl.[5] ............................................ H02M 3/335
[52] U.S. Cl. ...................................... 363/56; 340/663; 361/92; 363/21
[58] Field of Search ............... 363/21, 56, 97; 361/92; 340/663

[56] References Cited

U.S. PATENT DOCUMENTS

| 3,679,965 | 7/1972 | Wilkinson | 340/663 |
| 4,323,961 | 4/1982 | Josephson | 363/56 |
| 4,717,997 | 1/1988 | Hata | 363/56 |

FOREIGN PATENT DOCUMENTS 2061295 6/1972 Fed. Rep. of Germany ........ 361/92
244270 10/1987 Japan .

Primary Examiner—William H. Beha, Jr.
Attorney, Agent, or Firm—Staas & Halsey

[57] ABSTRACT

A voltage drop detection circuit (1) able to detect a drop in an output voltage of a switching regulator which includes an error detection circuit for detecting a difference between the output voltage and a predetermined value and a feedback circuit (PC1, R1) for controlling a control circuit (2) of a switching transistor in response to an output signal from the error detection circuit (R2, R4, R5, IC1). The voltage drop detection circuit (1) is constructed to operate by using the output of the error detection circuit (R2, R4, R5, IC1) as a control input. When the output voltage becomes lower than the predetermined value, the current of a shunt regulator (IC1) is cut off, a transistor (Q2) is turned off, and a voltage drop is output from terminals (E1, E2).

6 Claims, 4 Drawing Sheets

SWITCHING REGULAR UNDERVOLTAGE DETECTOR

CROSS-REFERENCE TO RELATED APPLICATION

The present application may be related to U.S. application Ser. No. 07/363,515.

BACKGROUND OF THE INVENTION

1. Field of the Invention

The present invention relates to a switching regulator used as a power source for an industrial electronic machine and the like, and more particularly, to a voltage drop detecting circuit for detecting a drop in an output voltage and issuing a voltage drop warning by outputting a signal to the outside.

2. Description of the Related Art

Switching regulators, in contrast with other regulators, are small-sized, light in weight, and highly efficient, and can cope with a wide range of input voltages, and thus are currently widely used as power sources for industrial electronic machines, such as computers, and servomotors, etc. Nevertheless, an erroneous operation of these industrial electronic machines may occur or the components thereof may be damaged if a drop in the supply voltage due to a malfunction of the power supply is not corrected. Therefore, a voltage drop detection circuit is provided on the power-supply side, separately from a voltage stabilizing circuit, to thereby improve the reliability of the whole system using the power supply. Namely, if a drop in the voltage occurs, the voltage drop detection circuit outputs a signal to the outside, to thereby quickly give an alarm or cut off the power supply.

FIG. 4 shows a circuit diagram of a forward-type switching regulator having a conventional voltage drop detecting circuit. In FIG. 4, A1 and A2 designate input terminals, which are connected to a DC power source, and B1 and B2 designate output terminals to which a stabilized DC voltage is delivered.

The voltage drop detection circuit is denoted as 5 and includes a comparator IC2, which compares the output voltage with a reference voltage of a Zener diode ZD1, and delivers a signal to terminals G1 and G2 when a drop in the output voltage occurs. H1 and H2 designate power supply terminals for the comparator IC2, and are connected to a DC power source.

The comparator IC2, however, cannot operate normally unless constantly supplied with a stabilized voltage, and thus the output of the switching regulator to be detected cannot be used as the power source for the comparator IC2. Namely, a separate power source to ensure a stabilized voltage is required. Moreover, a reference voltage source, such as the Zener diode ZD1, must be provided to set the detection level.

SUMMARY OF THE INVENTION

The present invention was created in consideration of the above circumstances, and an object thereof is to provide a voltage drop detection circuit which does not require a special power source for ensuring a stabilized voltage, and has a simple circuit configuration.

To solve the problem described above, according to the present invention, there is provided a voltage drop detection circuit able to detect a drop in the output voltage of a switching regulator which includes an error detection circuit arranged so that a current or voltage is increased and output when the output voltage rises above a predetermined value, and that a current or voltage is not output when the output voltage falls below the predetermined value, and a feedback circuit for controlling a control circuit of a switching transistor in response to a signal output from the error detection circuit. The voltage drop detection circuit comprises a detector operated by the output of the error detection circuit used as a control input.

Namely, the occurrence of a drop in the output voltage is detected by using the output of the error detector of the switching regulator as an input to the voltage drop detection circuit.

Therefore, if the output voltage of the switching regulator is higher than the predetermined value, the output voltage of the error detector is at a fixed value other than 0, and accordingly, a current flows to thereby activate the detector of the voltage drop detection circuit. If the output voltage of the switching regulator falls below the predetermined value, the current of the error detector is substantially 0, and accordingly, the detector of the voltage drop detection circuit is turned off, and this state is shown by an output of a voltage drop signal to the outside.

DESCRIPTION OF THE PREFERRED EMBODIMENTS

Embodiments of the present invention will now be described with reference to the drawings.

Figure 1:
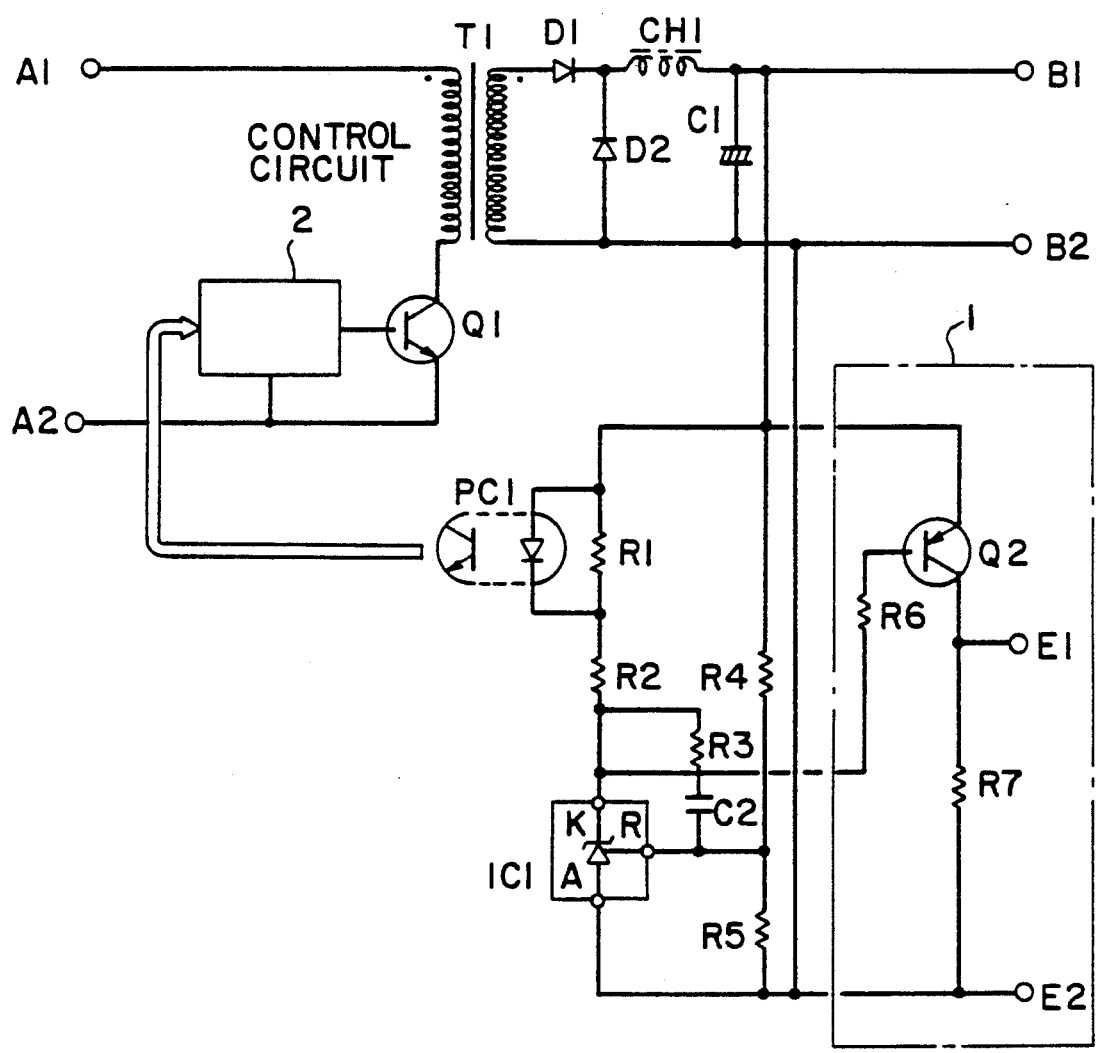
FIG. 1 is a circuit diagram showing a first embodiment of the present invention.

FIG. 1 is a circuit diagram of a switching regulator to which a voltage drop detection circuit according to a first embodiment of the present invention is applied. In FIG. 1, A1 and A2 designate input terminals which are connected to a DC power source, and Q1 designates a switching transistor which serves to convert an input DC voltage into a high-frequency square-wave voltage and transmits the voltage to the secondary side of a transformer T1. The high-frequency voltage transmitted to the secondary side is rectified by diodes D1 and D2 and then smoothed by a choke coil CH1 and a capacitor C1, whereby a stabilized DC voltage is delivered to output terminals B1 and B2.

IC1 designates a shunt regulator, R1 designates a resistor for causing a leakage current, produced when the shunt regulator IC1 is off, to by-pass a diode of a photocoupler PC1, and R2 designates a current limiting resistor. Resistors R4 and R5 divide the output voltage by the resistance ratio thereof, and supply the resulting voltage to an R-terminal of the shunt regulator IC1. If the output voltage rises, the shunt regulator IC1 uses this voltage as a reference value and reduces the resistance between the A- and K-terminals, to thereby increase a current flowing through the resistors R1 and R2. As a result, the terminal voltage of the resistor R1 rises, and thus the collector-emitter resistance of a transistor of the photocoupler PC1 is reduced by the diode of the photocoupler PC1.

If a drop in the output voltage occurs, the resistance between the A- and K-terminals of the shunt regulator IC1 is increased, and thus a current is not allowed to flow through the resistors R1 and R2. Accordingly, the transistor of the photocoupler PC1 is turned off.

An output signal from the shunt regulator IC1 is thus isolated and transmitted by the photocoupler PC1, to be applied to the input of a control circuit 2. Numeral 2 denotes the PWM control circuit, which controls the on-off time interval of the transistor Q1 in the following manner, in response to the input feedback signal. Namely, if the output voltage rises to a level higher than a predetermined value, the on-time of oscillation pulses is shortened to lower the voltage, and if the output voltage drops to a level lower than the predetermined value, the on-time of the oscillation pulses is lengthened to raise the voltage, and accordingly, the output voltage is kept at a constant value.

Numeral 1 denotes the voltage drop detection circuit according to the present invention, wherein Q2 designates a transistor and R6 and R7 denote resistors, respectively. The base and emitter of the transistor Q2 are connected across a series circuit of the resistors R1 and R2 through the resistor R6. The collector of the transistor Q2 is connected to the output of the switching regulator through the resistor R7, to be supplied with electric power. When the output voltage is higher than the predetermined value, therefore, the current flows through the resistors R1 and R2, as mentioned before, and thus a voltage is applied to the base of the transistor Q2 to turn on the transistor Q2, and a high-level signal is output to terminals E1 and E2.

If the output voltage becomes lower than the predetermined value, the base-emitter voltage of the transistor Q2 becomes substantially 0 V, and thus the transistor Q2 is turned off and a low-level signal is output to the terminals E1 and E2. Namely, the circuit is designed so that the transistor Q2 is turned off when a drop in the output voltage of the switching regulator occurs, and therefore, a drop in the supply voltage when the signal is output is permissible. Accordingly, the output of the switching regulator also can serve as the power supply for the present circuit.

Figure 2:
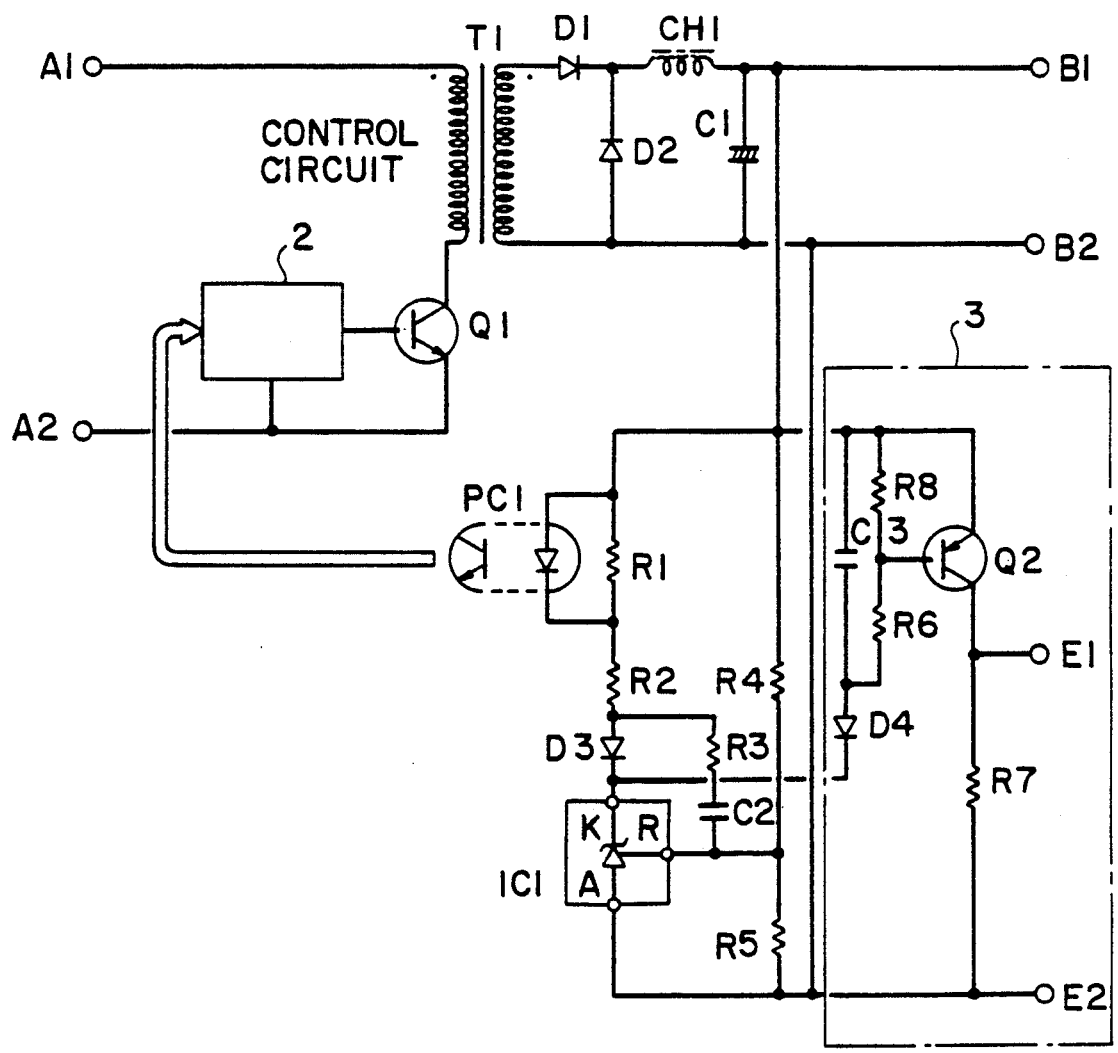
FIG. 2 is a circuit diagram showing a second embodiment of the present invention.

FIG. 2 shows a second embodiment of the present invention, wherein 3 designates a voltage drop detection circuit; C3 and D4 designate a capacitor and a diode, respectively, and form a series circuit by which external noise is made to by-pass the emitter-base circuit of the transistor Q2, to thereby prevent an erroneous operation of the transistor Q2; R8 designates a resistor which stabilizes the off-state of the transistor Q2; and D3 designates a diode for canceling a voltage shifted by the diode D4. In the operation of the present embodiment, as in the first embodiment, a high-level signal is output to the terminals E1 and E2 when the output voltage is higher than the predetermined value, and a low-level signal is output to the terminals E1 and E2 when the output voltage is lower than the predetermined value. The addition of the noise by-pass circuit ensures a greater operating reliability.

Figure 3:
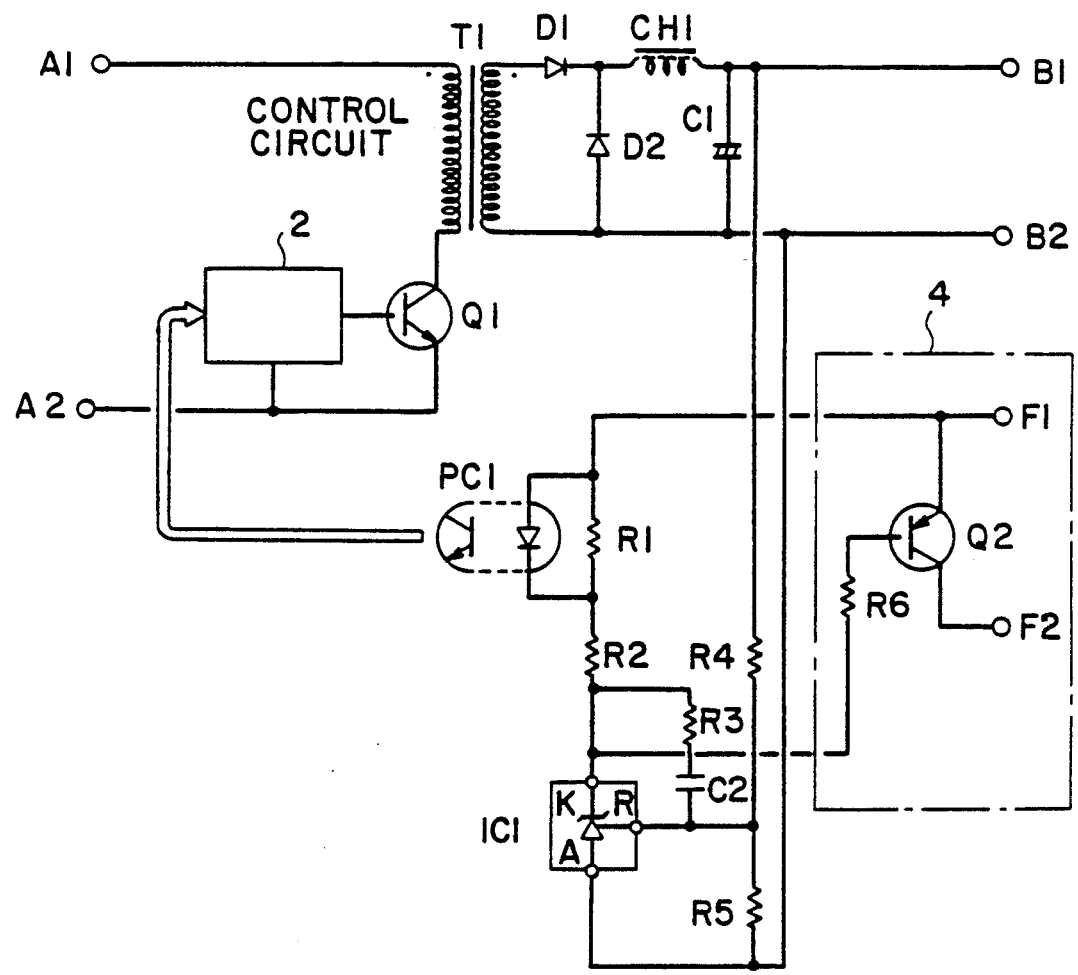
FIG. 3 is a circuit diagram showing a third embodiment of the present invention.
Figure 4:
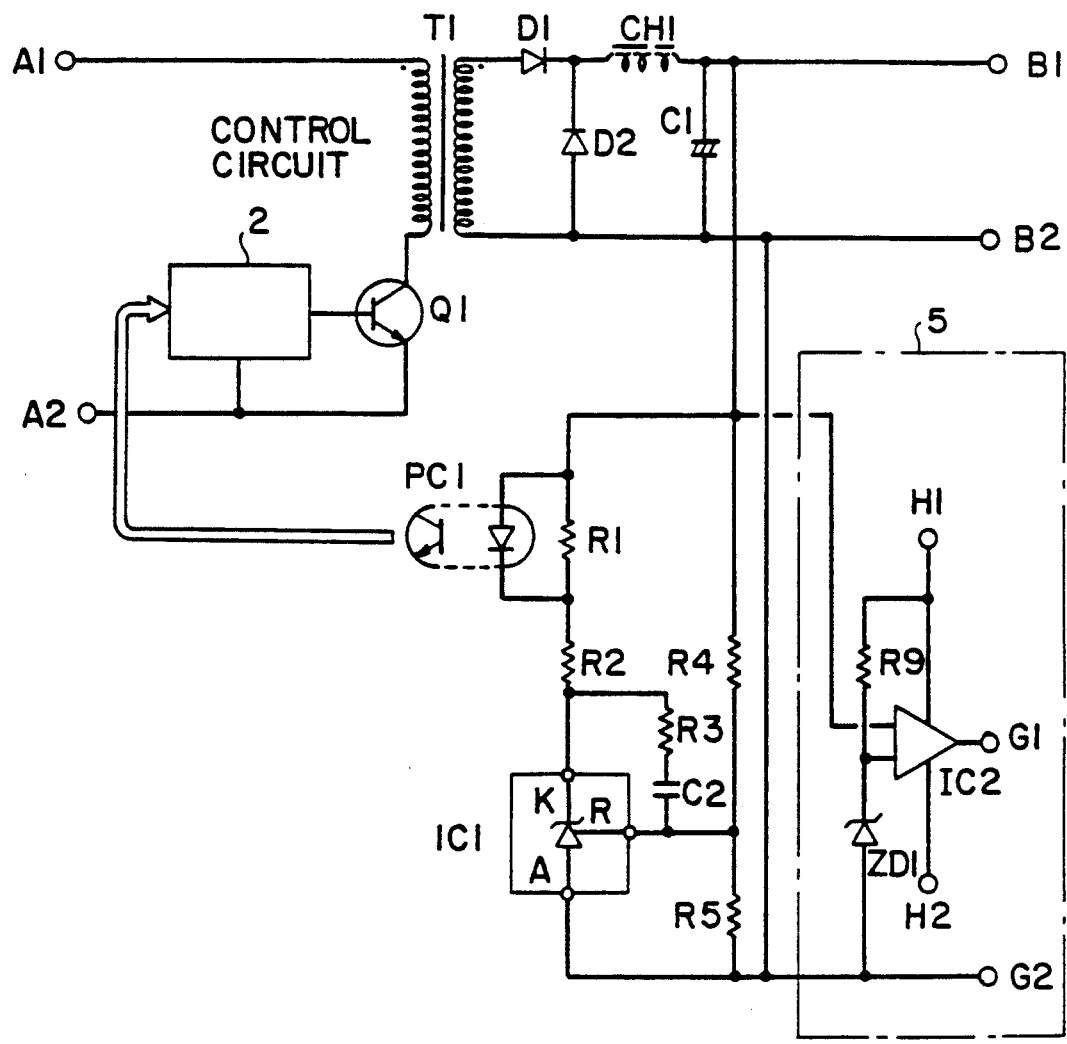
FIG. 4 is a circuit diagram showing a prior art voltage drop detection circuit.

Although the collector of the transistor Q2 in FIGS. 1 and 2 is connected to the output of the switching regulator through the resistor R7, whereby the transistor Q2 is supplied with electric power, the means of supplying power thereto is not limited to this method. FIG. 3 shows a third embodiment employing an alternative power supply method, in which the output circuit section of the circuit configuration of the first embodiment is modified as an open-collector type. Numeral 4 denotes a voltage drop detection circuit, which outputs a signal indicating a drop in the voltage to terminals F1 and F2. According to this method, the power supply conditions can be freely selected in accordance with the external circuit. The output system of such an open-collector type circuit can be also used in the circuit arrangement of the second embodiment.

Accordingly, the output voltage drop detection circuit of the present invention can be composed of a simple circuit using only one transistor as an active element, and a special reference voltage source or the like is not required.

According to the present invention, as described above, a drop in the voltage is detected by using the output of an error detector of the switching regulator as an input, whereby a voltage drop detection circuit having a simple construction can be realized because a special power source is not required, and thus the cost of the power supply system is reduced.

I claim:

1. A switching regulator output change detector for a switching regulator including an error detection circuit, arranged such that a current or voltage is increased and output when an output voltage at an output of the switching regulator rises above a predetermined value, and that a current or voltage is not output when the output voltage falls below the predetermined value, and a feedback circuit at the output of the switching regulator, for controlling a control circuit of a switching transistor in response to an output signal from an output of said error detection circuit, said switching regulator output change detector comprising:

a detector including only one transistor coupled by a collector and an emitter to the output of the switching regulator, said detector being operated by using the output of said error detection circuit as a control input.

2. A switching regulator output change detector according to claim 1, wherein said switching regulator output change detector uses a signal responsive to the output of said switching regulator as a sole power supply.

3. A switching regulator output change detector according to claim 1, wherein said error detection circuit includes a shunt regulator.

4. A switching regulator output change detector according to claim 1, wherein said only one transistor is connected to a direct current bias circuit.

5. A switching regulator output change detector for a switching regulator including an error detection circuit having a shunt regulator for supplying a reference voltage, said error detection circuit being for controlling a control circuit of a switching transistor in response to an output of said error detection circuit, comprising:

a detector including only one transistor which is coupled to receive a signal responsive to an output of the switching regulator as a sole power supply, and which is coupled to the shunt regulator for receiving the reference voltage, said detector being for generating an alarm signal based on the output of the switching regulator and the reference voltage when the output of the switching regulator falls below a predetermined value.

6. A switching regulator output change detector for a switching regulator having at least one output terminal and including an error detection circuit having a shunt regulator for supplying a reference voltage, said error detection circuit being for controlling a control circuit of a switching transistor in response to an output of said error detection circuit, comprising:
 a detector including only one transistor which is an open-collector PNP transistor, which is coupled by a base or a gate terminal of the only one transistor to a terminal of the shunt regulator for receiving the reference voltage, and which is coupled by an emitter of the only one open-collector PNP transistor to the at least one output terminal of the switching regulator, said detector being for generating an alarm signal based on the output of the switching regulator and the reference voltage when the output of the switching regulator falls below a predetermined value.

* * * * *